(12) United States Patent
Jin

(10) Patent No.: US 8,056,435 B2
(45) Date of Patent: Nov. 15, 2011

(54) TILTING DEVICE FOR STEERING COLUMN

(75) Inventor: Jeong Moon Jin, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 981 days.

(21) Appl. No.: 11/971,576

(22) Filed: Jan. 9, 2008

(65) Prior Publication Data

US 2009/0019962 A1    Jan. 22, 2009

(30) Foreign Application Priority Data

Jul. 19, 2007   (KR) ........................ 10-2007-0072250

(51) Int. Cl.
    *B62D 1/18*   (2006.01)

(52) U.S. Cl. ........................................ 74/493; 280/775

(58) Field of Classification Search ............... 74/492, 74/493; 280/775
    See application file for complete search history.

(56) References Cited

U.S. PATENT DOCUMENTS

| | | | | |
|---|---|---|---|---|
| 5,129,280 A | * | 7/1992 | Beauch et al. | 74/493 |
| 5,566,585 A | * | 10/1996 | Snell et al. | 74/493 |
| 5,598,741 A | * | 2/1997 | Mitchell et al. | 74/493 |
| 6,205,882 B1 | * | 3/2001 | Jolley | 74/493 |
| 6,799,779 B2 | * | 10/2004 | Shibayama | 280/777 |
| 2004/0159174 A1 | * | 8/2004 | Raav et al. | 74/493 |
| 2005/0017492 A1 | * | 1/2005 | Ohtsu et al. | 280/775 |
| 2005/0097978 A1 | * | 5/2005 | Rhouma et al. | 74/492 |
| 2005/0199087 A1 | * | 9/2005 | Li et al. | 74/493 |
| 2006/0022446 A1 | * | 2/2006 | Murakami et al. | 280/775 |
| 2006/0219043 A1 | * | 10/2006 | Fujiu et al. | 74/493 |
| 2008/0134827 A1 | * | 6/2008 | Jo | 74/493 |

* cited by examiner

*Primary Examiner* — Richard W Ridley
*Assistant Examiner* — Terence Boes
(74) *Attorney, Agent, or Firm* — Morgan, Lewis & Bockius LLP

(57) ABSTRACT

Disclosed is a tilting device for a steering column comprising: a steering column inclinedly arranged in a rear direction of a vehicle; a bracket located between the steering column and a shroud, a cover that shields the steering column from an outside, to guide the steering column for tilting; and a tilting locking means slidably arranged substantially near to an upper surface of the steering column to enable the steering column to be tilted or not to be tilted.

4 Claims, 4 Drawing Sheets

TILTING DEVICE FOR STEERING COLUMN

CROSS-REFERENCE TO RELATED APPLICATION

This application claims priority from and the benefit of Korean Patent Application No. 10-2007-0072250, filed on Jul. 19, 2007, which is hereby incorporated by reference for all purposes as if fully set forth herein.

BACKGROUND OF THE INVENTION

1. Field of the Invention

The present invention relates to a tilting device for a vehicular steering column, and more particularly, to a tilting device for a vehicular steering column that is capable of preventing a driver's knees from being injured and of adjusting the angle of the steering column by providing a sliding-type tilt lever on the upper side portion of the steering column.

2. Discussion of the Background

In general, a tilting device is so designed for a driver to tilt a steering column by adjusting the position of a steering wheel to accommodate a driver's figure for more comfortable driving.

Various shifting devices have been employed for the driver's safety and the transmission of the operating force to gears. Of these shifting devices, a steering column that transmits the operating force of a steering wheel to a steering gear is generally inclinedly mounted by about 20 to 30 degrees.

It is compulsory to mount a safety device, such as air bag system, in a vehicle in order to protect the driver from the impact to the steering wheel and steering column.

FIG. 1 is a perspective view of illustrating a conventional tilting device including a tilt lever mounted at a lower part of the steering column according to a prior art.

The conventional tilting device includes a key-set 2 provided on a steering column 3 for transmitting the operating force from a steering wheel, an adjustment unit 4 for fastening or adjusting the tilting angle of the steering column 3, and a tilt lever 1 provided on the lower part of the steering column 3 for the hinge-connection between the steering column 3 and the adjustment unit 4.

In addition, a shroud (not shown) can be further provided to cover the outside of the steering column 3 to prevent the interference of unwanted materials from the outside. However, the tilt lever 1 is externally protruded from the shroud to be handled by the driver and furthermore positioned under the lower part of the steering column 3.

The steering column 3 configured as above, can adjust the height of the steering wheel according to the driver's figure. At this time, when the driver lifts up the tilt lever 1, the adjustment unit 4 that is hingedly connected to the tilt lever 1 cooperates with the tilt lever 1, so that the angle of the steering column can be adjusted.

In the conventional tilting device configured as above, however, the driver can be injured due to impact of his/her knees to the tilt lever 1 caused by an accident such as car collisions since the tilt lever 1 is externally protruded from the shroud and positioned under the lower part of the steering column 3 as set forth above.

A shock absorbing material, such as foam, is packed between the shroud and the steering column 3 to increase the driver's safety. Particularly, it is necessary to ensure space of more than at least 25 mm between the tilt lever 1 and the steering column 3 so that the entire parts of the steering column 3 can be protected with the aid of the shock absorbing material. However, in the conventional tilting device, the space between the tilt lever 1 and the steering column 3 is essentially narrow since the tilt lever 1 is configured to hingedly cooperate with the steering column 3 and thus the tilt lever 1 is fastened substantially near to the outer periphery of the steering column. As a result, this configuration and mechanism of the conventional art makes the gap between the tilt lever 1 and the steering column 3 narrow as shown in FIG. 1. Accordingly, there is a difficulty in a process of inserting the shock absorbing material in the shroud, thus leading to the requirement of longer process time.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been designed to overcome the above problems, and an aspect of the present invention provides a tilting device including a tilt lever that is positioned at the upper side portion of a steering column and can be slidably shifted substantially along the longitudinal direction of the steering column, so that a shock absorbing material can be easily inserted in a shroud and a driver can be effectively protected from possible impact to tilt lever because the tilting device is provided at the upper side portion of a steering column.

An exemplary embodiment of the present invention provides a tilting device for a steering column comprising: a steering column inclinedly arranged in a rear direction of a vehicle; a bracket located between the steering column and a shroud, a cover that shields the steering column from an outside, to guide the steering column for tilting; and a tilting locking means slidably arranged substantially at an upper surface of the steering column between the steering column and the shroud to enable the steering column to be tilted or not to be tilted.

The bracket may comprise an upper fixing portion arranged to come in contact with an upper surface of the steering column for coupling with an inside of the shroud, and at least a supporting portion perpendicularity extending from a surface of the upper fixing portion and coming in contact with at least a connecting portion of the steering column.

Each of the supporting portions may have at least a slot-type hole that is formed long in an upper and lower direction and perforated in a left and right direction.

The tilting locking means may comprise a rotating lever that pivotally contacts an outer surface of the at least a supporting portion. The rotating lever may engage/disengage the supporting portion onto/from the connecting portion of the steering column to enable the steering column to be tilted or not to be tilted.

The rotating lever may have a proximate end portion that is pivotally hinged to the connecting portion of the steering column by a lever bolt and a distal end portion that rotates with respect to the lever bolt, wherein the rotating lever may be pivotally engaged onto or disengaged from the external surface of the supporting portion when the lever bolt rotates clockwise or counterclockwise.

The lever bolt may be connected through a connecting hole of the connecting portion, the connecting portion formed in a shape of a plate extending from the steering column and contacting an inner surface of the supporting portion of the bracket.

The tilting locking means may further comprise a tilt lever, the tilt lever pivotally connected to the distal end portion of the rotating lever for transmitting a driver's operating force to adjust the tilting angle of the steering column.

The tilt lever may comprise an operating portion arranged to slidably contact an upper surface of the steering column, and a guiding portion bent from a lower portion of the operating portion along an upper side of the steering column and extending to the distal end of the rotating lever.

The operating portion may further comprise a guide hole for enabling the tilt lever to slidably move substantially along the longitudinal direction of the steering column, the guide hole slotted long in a longitudinal direction of the operating portion and engaged with a protrusion that is projected from an upper surface of the steering column.

A hooked portion may be provided at a distal end of the guiding portion to receive a protrusion that is projected outwards from the distal end portion of the rotating lever.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
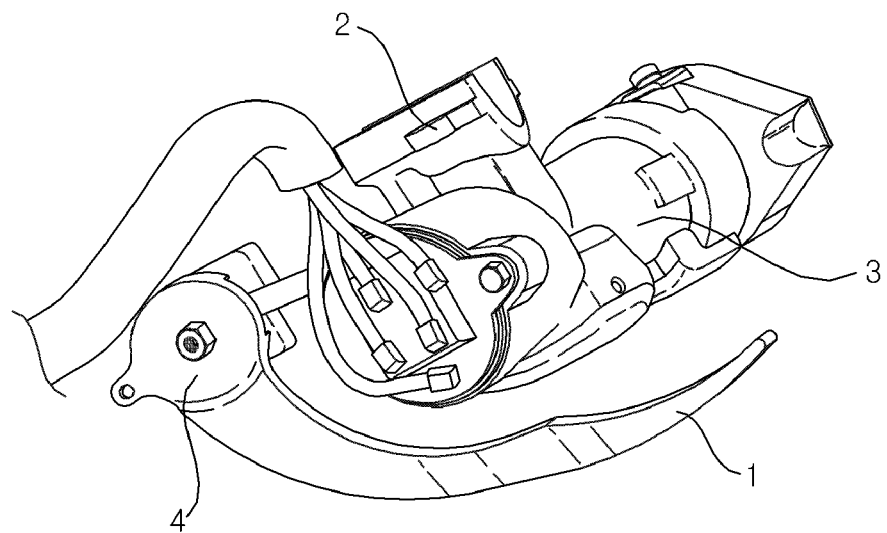
FIG. 1 is a perspective view of illustrating a tilting device including a tilt lever mounted at a lower part of a steering column according to a prior art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE ILLUSTRATED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a tilting device for a steering column according to an exemplary embodiment of the present invention will be described in more detail with reference to accompanying drawings.

Figure 2:
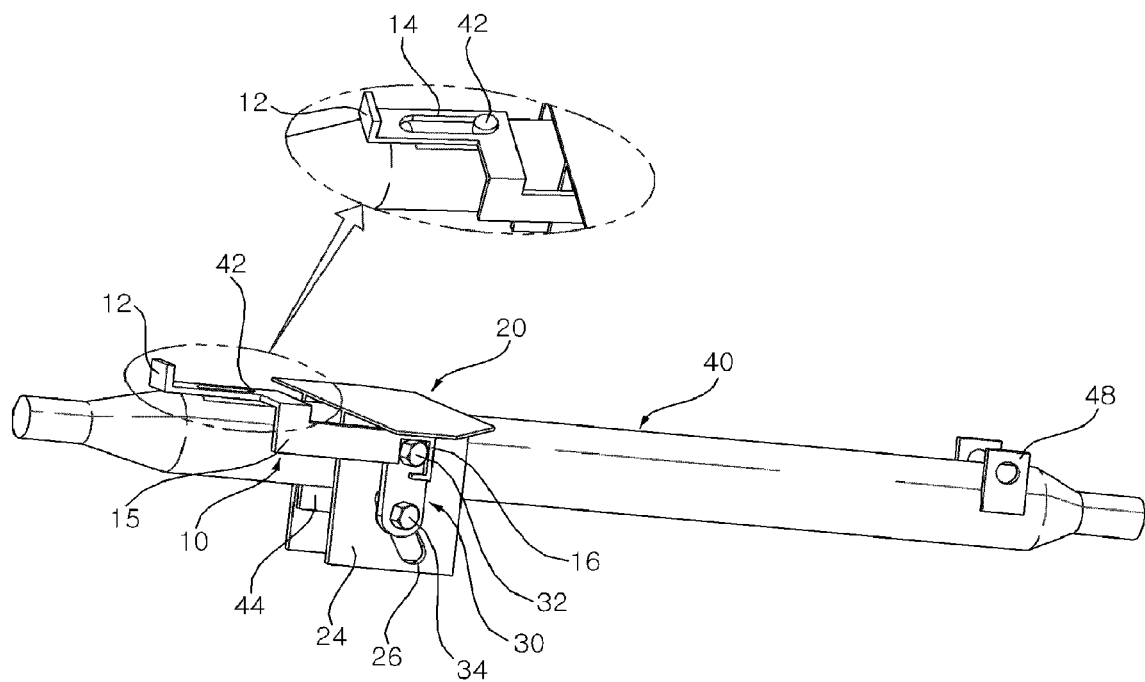
FIG. 2 is a side view of illustrating a tilting device of a steering column according to an exemplary embodiment of the present invention.
Figure 3:
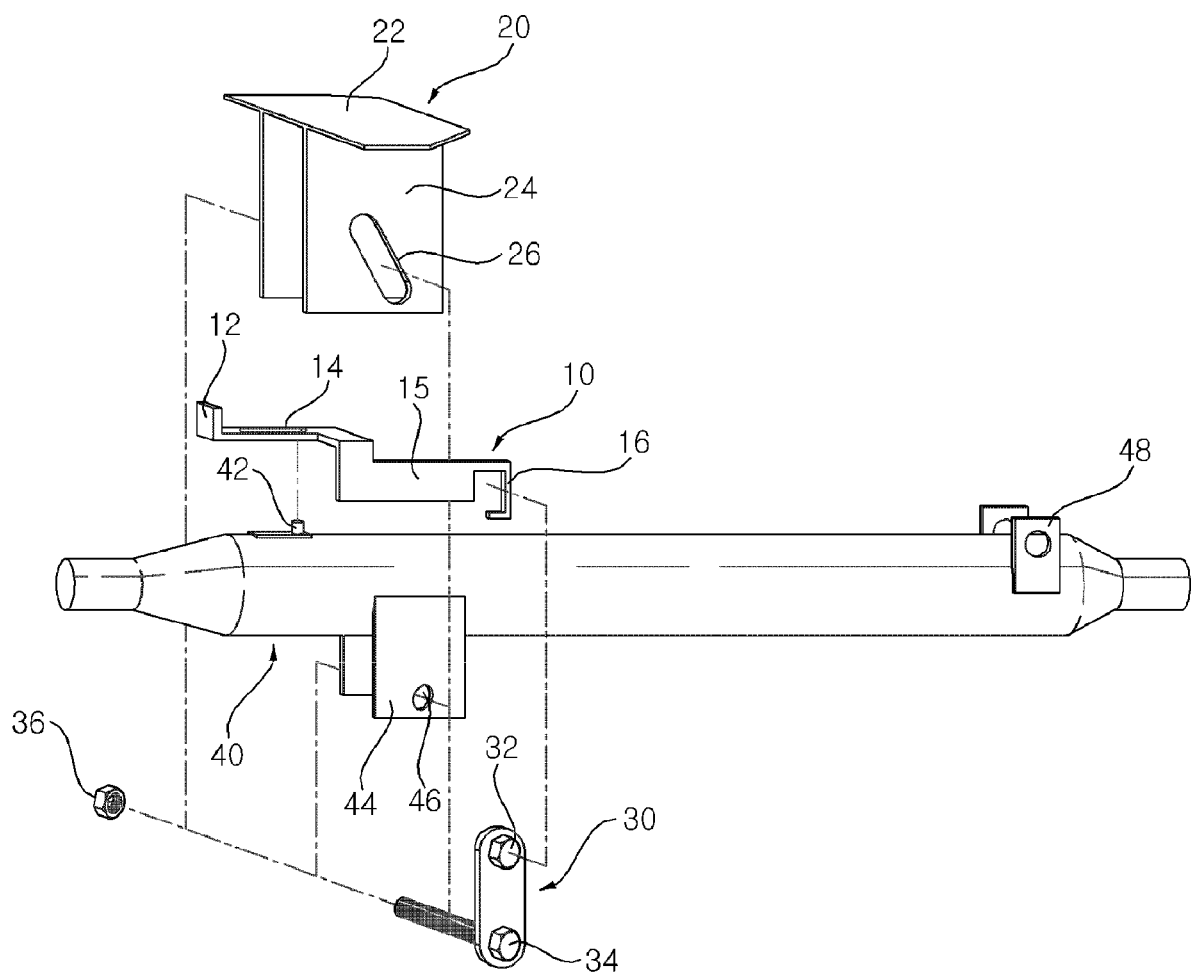
FIG. 3 is an exploded perspective view of illustrating a tilting device of a steering column according to an exemplary embodiment of the present invention.
Figure 4:
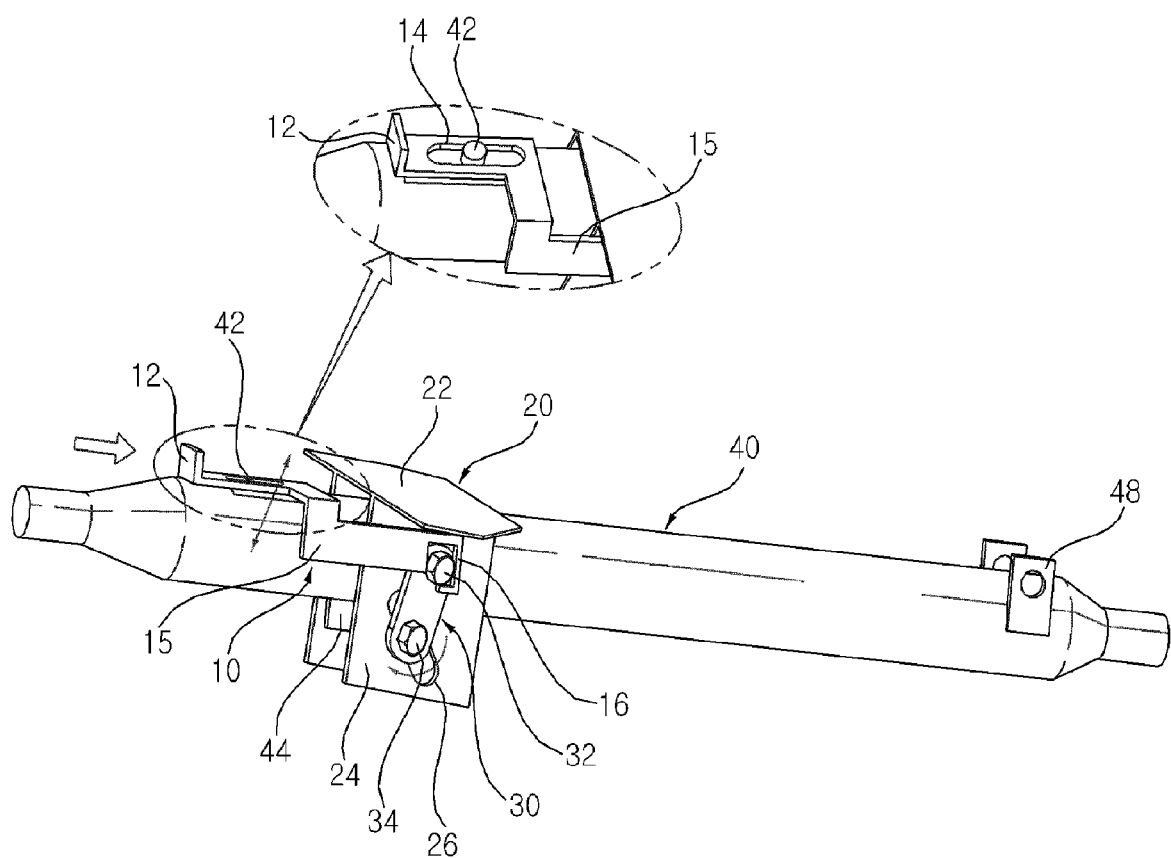
FIG. 4 is a view of illustrating adjusting the angle of a steering column according to an exemplary embodiment of the present invention.
Figure 5:
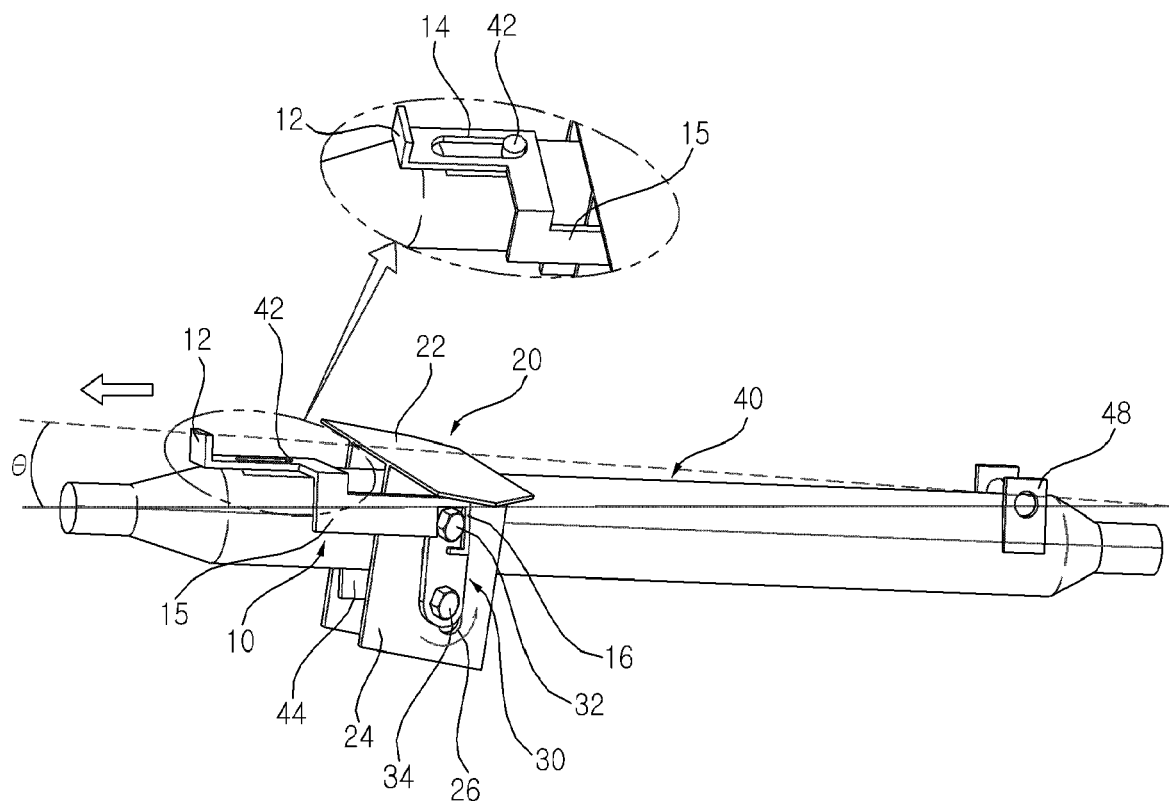
FIG. 5 is a view of illustrating the steering column that has been angle-adjusted according to an exemplary embodiment of the present invention.

FIG. 2 is a side view of illustrating a tilting device of a steering column according to an exemplary embodiment of the present invention, FIG. 3 is an exploded perspective view of illustrating a tilting device of a steering column according to an exemplary embodiment of the present invention, FIG. 4 is a view of illustrating adjusting the angle of a steering column according to an exemplary embodiment of the present invention, and FIG. 5 is a view of illustrating the steering column that has been angle-adjusted according to an exemplary embodiment of the present invention.

Referring to FIGS. 2 and 3, the tilting device includes a steering column 40, a bracket 20, and a tilting locking means. The steering column 40 is upwardly inclined in the rear direction of a vehicle with respect to the hinge 48. The shroud covers the steering column 40 to shield the steering column 40 from the external interference. The bracket 20 intervenes between the steering column 40 and the shroud to guide the steering column 40 upon tilting. The tilting locking means may comprise a rotating lever 30 and a tilt lever 10. The tilt lever 10 is located at the upper side portion of the steering column 40 for controlling the steering column 40 to be tilted or to be not tilted.

The shroud (not shown) is positioned above the bracket 20 and enables a driver to transmit the operating force to the steering column 40. The shroud for shielding the steering column 40 from the external interference has a wipe module and a switch module for operating electronics such as a lighter. A shock absorbing material, such as foam, is filled between the shroud and the steering column 40 for protecting the driver from impact caused by collisions.

The bracket 20 that is arranged to accommodate substantially the upper surface of the steering column 40 includes an upper fixing portion 22 and at least a supporting portion 24. The outer surface of the upper fixing portion 22 of the bracket 20 is coupled to a part of the inner portion of the shroud. The supporting portions 24 extend downwardly in the perpendicular direction from the inner surface of upper fixing portion 22. Both inner surfaces of the supporting portions 24 of the bracket 20 face the outer surfaces of at least a connecting portions 46 of the steering column 40 as explained below in detail. In an exemplary embodiment, the supporting portions 24 may be positioned in parallel.

The upper fixing portion 22 serves as an intermediary for coupling the shroud to a portion of the steering column 40, and the supporting portions 24 function to guide the steering column 40 upon tilting.

Each of the supporting portions 24 has at least a slot-shaped hole 26 that is formed long in the upper and lower directions and penetrated in the left and right directions. Through the slot-shaped holes 26 a lever bolt 34 is connected, and the steering column 40 can be tilted within the length of the slot-shaped hole 26 as the lever bolt 34 follows slot-shaped holes 26 as shown in FIG.2. The tilting angle and distance of the steering column 40 may depend on the length of the slot-shaped hole 26.

Further, at least a rotating lever 30 is provided to engage or disengage the inner surface of either one of the supporting portions 24 to the outer surface of connecting portion 44 of the steering column 40 in tilting or not tilting. The rotating lever 30 includes a lever bolt 34. A distal end of the lever bolt 34 passes through the slot-shaped hole 26 of the supporting portion 24 and the connecting hole 46 of the connection portion 44. A proximate end of the lever bolt 34 protrudes outwards from the rotating lever 30 to fasten the rotating lever 30 as shown in FIG. 3.

The lever bolt 34 may be integrally formed with the rotating lever 30 in another exemplary embodiment. However, the present invention is not limited thereto, and any configurations may be employed as long as the lever bolt 34 can be interlocked with the rotating lever 30.

The lever bolt 34 functions as a connecting and pivotal member. That is, the lever bolt 34 not only enables the rotating lever 30 to tightly couple the supporting portion 24 to the connecting portion 44 but also pivotally rotate a distal end portion of the rotating lever 30 with respect to the lever bolt 34. Therefore, irrespective of the name of "bolt", the lever bolt 34 may pivotally fix the proximate end portion of the rotating lever 30 so that the distal end portion of the rotating lever 30 can be pivotally engaged or disengaged.

In the tilting locking means configured as above, the lever bolt 34 may be fastened or loosened while the rotating lever 30 rotates with respect to the proximate end portion of the lever bolt 34, Therefore, the rotating lever 30 may be pivotally controlled to engage or disengage the supporting portion 20 onto/from the connecting portion 44 of the steering column 40, so that the steering column 40 can be locked or unlocked with the supporting portion 24 of the bracket that is attached to the shroud (not shown).

More specifically, since the rotating lever 30 cooperates with the steering column 40, the steering column 40 can not be tilted because of frictional force between the connecting portion 44 and the supporting portions 24 when the rotating lever 30 is engaged onto the outer surface of the supporting portions 24. However the steering column 40 can be tilted according to a driver's figure when the frictional force between the connecting portion 44 and the supporting portions 24 is removed, i.e, when the rotating lever 30 is disengaged from the outer surface of the supporting portions 24.

The connecting portion 44 will be explained in detail hereinafter.

In an exemplary embodiment of the present invention, at least a plate-shaped connecting portion 44 extends from a portion of the steering column 40 and then contacts the inside surface of the supporting portions 24. The connecting portion 44 includes a connecting hole 46 through which the lever bolt 34 is connected as explained above. A nut 36 is provided at the other supporting portion 24 on which the distal end of the lever bolt 34 is positioned, and coupled to the distal end portion of the lever bolt 34.

The connecting hole 46 has a screw thread (not shown) therein, which corresponds complementarily to the screw thread that is formed on the outer surface of the lever bolt 34. Accordingly, in an exemplary embodiment of the present invention, when the lever bolt 34 rotates counterclockwise and thus the lever bolt 34 is fastened with the aid of a screw thread of the connecting hole 46, the rotating lever 30 engage the supporting portion 24 onto the connecting portion 44 of the steering column. In contrast, when the lever bolt 34 rotates clockwise and thereby is loosened, the rotating lever 30 disengages the supporting portion 24 from the connecting portion 44 of the steering column 40 with the aid of a screw thread of the connecting hole 46.

The tilting locking means includes a tilt lever 10 that is coupled to the distal end portion of the rotating lever 30 for pivotally transmitting a driver's operating force.

As shown in FIGS. 4 and 5, the tile lever 10 includes an operating portion 12 and a guiding portion 15. The operating portion 12 is arranged to slidably contact the upper surface of the steering column 40. The guiding portion 15 is bended from the distal end portion of operating portion 12 along the upper surface of the steering column 40 to a side surface thereof, and extends to the distal end portion of the rotating lever 30.

The operating portion 12 further includes a guide hole 14 that is slotted long in the longitudinal direction of the operating portion 12. A protrusion 42 that protrudes upward from a portion of the upper surface of the steering column 40 is inserted through the guide hole 42 of the operating portion 12. The protrusion 42 acts as a guide that enables the tilt lever 10 to slidably move along the guide hole 42.

The tilt lever 10 may comprise a hooked portion 16. The hooked portion 16 is extended from the distal end portion of the guiding portion 15 so that the tilt lever 10 can be easily coupled to the distal end portion of the rotating lever 30. A protrusion 32 that is provided at the distal end portion of the rotating lever 30 is inserted through the hooked portion 16 of the tilt lever 10 and functions as a pivot.

Even though the hooked portion 16 has been described to have a shape of a hook, the present invention is not limited thereto. That is, any configurations for the hooked portion 16 may be employed, as long as an operating force of the driver's figure may be transmitted to the rotating lever 30 by the configurations so that the rotating lever 30 may be pivotally rotated with respect of the protrusion 32 positioned at the distal end portion of the rotating lever 30 when the tilt lever 10 slides up and down substantially in the longitudinal direction of the steering column 40.

An example of an operation of the tilting device of the steering column 40 configured as above will be described with reference to FIGS. 4 and 5.

FIG. 4 shows the unlocking mechanism of the steering column 40. Referring to FIG. 4, first, the operating portion 12 of the tilt lever 10, which is mounted at the upper side portion of the steering column 40 and projected outside the shroud, slides downwards the steering column 40. At this time, since the tilt lever 10 is positioned at the upper side portion of the steering column 40, and therefore, can be identified by a driver upon operating the tilt lever 10, the operability can be improved. Furthermore, since the tilt lever 10 is located at the upper side portion of the shroud, and does not contact with the driver's knees, the driver's knees can be protected from impact to the tilt lever 10 that can be caused by vehicle collisions. Furthermore the bracket 20 is positioned between the shroud (not shown) and the steering column 40, the gap the shroud (not shown) and the steering column 40 is sufficiently enough to accommodate the shock absorbing material.

Next, when the tilt lever 10 is pushed downward the steering column 40, the distal end portion of the rotating lever 30 is pivoted clockwise by a predetermined angle with respect to the proximate end portion of the lever bolt 34 to make the lever bolt 34 unfastened. At this time, the connecting portion 44 of the steering column 40 that has been engaged onto the inner surface of the supporting portion 24, starts to be disengaged so that the steering column 40 can be tilted along the slot-shaped hole 26 of the supporting portions 24 of the bracket 22 which is attached to the shroud (not shown). When the rotating lever 30 is unfastened, the steering column 40 can be tilted upwards or downwards along the slot-shaped hole 26 freely so that the driver can adjust the location of the steering wheel.

FIG. 5 shows the locking mechanism of the steering column 40. When tilting is complete with the degree of ⊖ in this example, the driver may draw slidingly the tilt lever 10 upwards along the upper surface of the steering column 40 to prevent the steering column 40 from freely tilting, as shown in FIG. 5. At this time, the tilt lever 10 makes the rotating lever 30 return counterclockwise to its home position so that the connecting portion 44 of steering column 40 is re-engaged with the supporting portion 24 and thus the steering column 40 is fastened again.

As mentioned above, the tilting device of the present invention provides the tilt lever at the upper side portion of the steering column, so that the angle of the steering wheel can be adjusted by making the tilt lever slide upward or downward the steering column. Moreover, since the tilt lever is placed at the upper side portion of the steering column, it can be possible to prevent the driver from being injured from impact to the tilt lever caused by the vehicle collisions. Furthermore since the tilting locking means is positioned between the shroud and the steering column, the gap between the shroud and the steering column 40 can sufficiently accommodate the shock absorbing material.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A tilting device for a steering column comprising:
   a steering column including at least a connecting portion inclinedly arranged in a rear direction of a vehicle;
   a bracket configured to guide the steering column for tilting; and
   a tilting locking means slidably arranged substantially to an upper surface of the steering column to enable the steering column to be tilted or not to be tilted,
   wherein the bracket comprises:
      an upper fixing portion arranged to accommodate the upper surface of the steering column, and
      at least a supporting portion perpendicularly extending from a surface of the upper fixing portion and coming in contact with an outer surface of the connecting portion of the steering column,
   wherein the tilting locking means comprises:
      a rotating lever that can pivotally engage the supporting portion onto the connecting portion of the steering column to lock the steering column or that can pivotally disengage the supporting portion from the connecting portion of the steering column to unlock the steering column,
   wherein the rotating lever has a proximate end portion that is pivotally hinged to the connecting portion of the steering column by a lever bolt and a distal end portion of the rotating lever that pivotally rotates with respect to the proximate end portion of the lever bolt when the rotating lever is engaged onto or disengaged from the supporting portion,
   wherein the lever bolt connects the supporting portion of the bracket and the connecting portion of the steering column through a connecting hole disposed on the connecting portion, the connecting portion formed in a shape of a plate extending from the steering column and contacting an inner surface of the supporting portions of the bracket,
   wherein the connecting hole has a screw thread which correpsponds complementarily to a screw thread that is formed on the outer surface of the lever bolt.

2. The tilting device of claim 1, wherein the supporting portion has at least a slot that is formed long in an upper and lower direction and perforated in a left and right direction.

3. A tilting device for a steering column comprising:
   a steering column including at least a connecting portion inclinedly arranged in a rear direction of a vehicle;
   a bracket configured to guide the steering column for tilting; and
   a tilting locking means slidably arranged substantially to an upper surface of the steering column to enable the steering column to be tilted or not to be tilted,
   wherein the bracket comprises:
      an upper fixing portion arranged to accommodate the upper surface of the steering column, and
      at least a supporting portions perpendicularly extending from a surface of the upper fixing portion and coming in contact with an outer surface of the connecting portion of the steering column,
   wherein the tilting locking means comprises:
      a rotating lever that can pivotally engage the supporting portion onto the connecting portion of the steering column to lock the steering column or that can pivotally disengage the supporting portion from the connecting portion of the steering column to unlock the steering column,
   wherein the tilting locking means further comprises a tilt lever, the tilt lever coupled to a distal end portion of the rotating lever for transmitting a driver's operating force,
   wherein the tilt lever comprises:
      an operating portion arranged to slidably contact the upper surface of the steering column, and
      a guiding portion bent from a distal end portion of the operating portion downwards along an upper side surface of the steering column and extending to a distal end of the rotating lever.

4. The tilting device of claim 3, wherein the tilt lever further comprises a hooked portion extending from a distal end of the guiding portion to receive a protrusion that is projected from the distal end portion of the rotating lever wherein the protrution moves or translates within the hooked portion when the operation portion is drawn upwards or downwards along the longitudinal direction of the steering column.

* * * * *